3,036,068
C-6,19-STEROIDAL LACTONES
Howard J. Ringold and Albert Bowers, Mexico City,
Mexico, assignors to Syntex S.A., Mexico City, Mexico,
a corporation of Mexico
No Drawing. Filed July 15, 1960, Ser. No. 42,969
Claims priority, application Mexico Jan. 6, 1960
19 Claims. (Cl. 260—239.57)

The present invention relates to novel cyclopentanophenanthrene compounds and to a process for the preparation thereof.

More particularly the present invention relates to novel lactones of 6-hydroxy-19-carboxy-androstanes having a keto, hydroxyl or acyloxy group at C–3 and at C–17 and which may also contain a hydrocarbon radical at C–17α and unsaturation at C–1,2 and C–4,5.

The novel compounds of the present invention which are anabolic agents with low androgenicity are represented by the following formula:

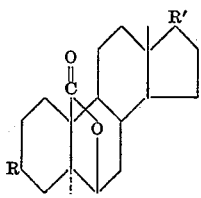

In the above formula, R represents keto, β-hydroxy or β-acyloxy and R' represents keto

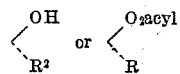

wherein $R^2$ represents hydrogen or an aliphatic hydrocarbon group, saturated or unsaturated, containing up to 8 carbon atoms. When R and R' are keto, double bonds may be present at C–1,2 and C–4,5.

The acyl groups are derived from hydrocarbon carboxylic acids containing up to 12 carbons, saturated or unsaturated, of straight, branched, cyclic or cyclic-aliphatic chain, aromatic and may be substituted by functional groups such as hydroxyl, acyloxy of up to 12 carbon atoms, alkoxy of up to 8 carbon atoms, amino or halogen. Typical ester groups include the acetate, propionate, butyrate, hemisuccinate, enanthate, caproate, benzoate, phenoxyacetate, trimethylacetate, aminoacetate, cyclopentylpropionate and β-chloropropionate.

Typical aliphatic hydrocarbon groups at C–17α are methyl, ethyl, propyl, butyl, vinyl, 1-propenyl, 2-butenyl, ethinyl and 1-butenyl, ethinyl and 1-butinyl.

The novel lactones of the present invention also lower the blood cholesterol levels, are bacteriostatic against gram positive bacteria and are useful in the treatment of premenstrual tension. The 6,19-lactone of 3β,6β,17β-trihydroxy-androstane-19-carboxylic acid is also a useful intermediate for the preparation of 19-nor-Δ⁴-androstene-3,17-dione, a key compound for the synthesis of the valuable hormones of the 19-nor-androstane series, such as 17α-ethinyl-19-nor-testosterone. This novel method of producing 19-nor compounds from 10-methyl androstanes is extremely valuable and practical since it differs from the conventional methods in that it avoids aromatization of ring A and the subsequent Birch reduction which present difficulties when carried out on an industrial scale.

The novel compounds of the present invention are prepared by a process illustrated by the following equation:

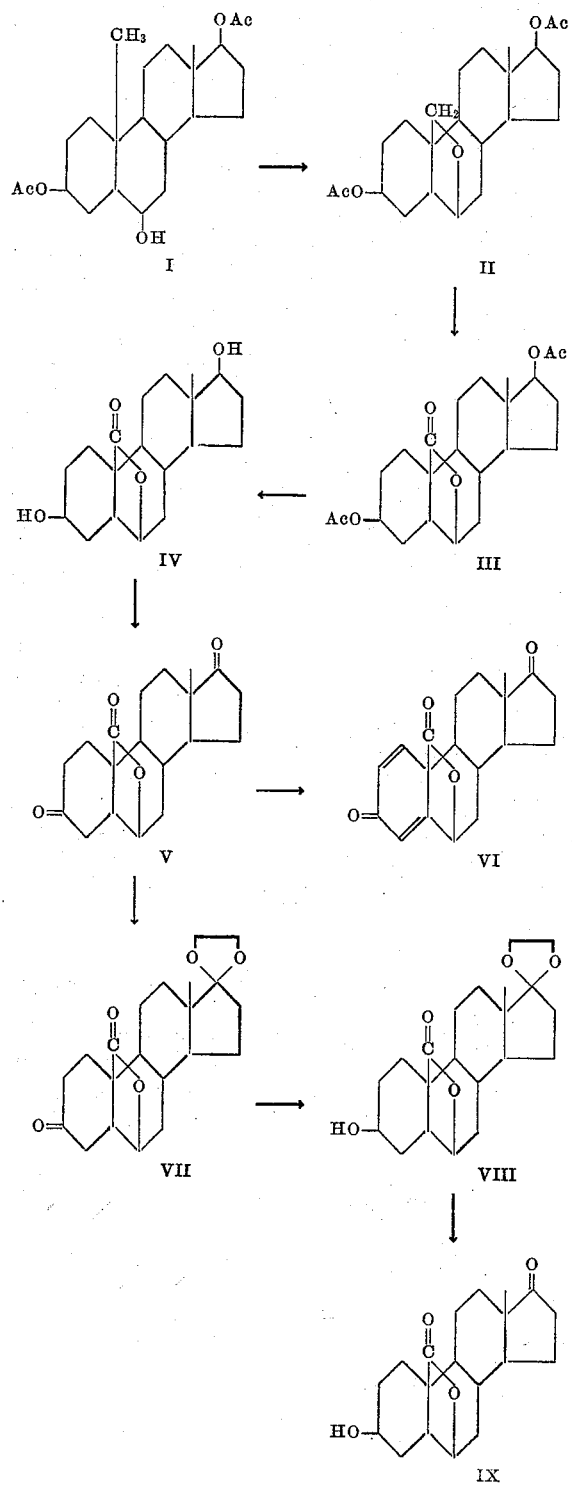

In the above equation, Ac represents the acetyl radical but other acyl groups may be substituted therefor.

In practicing the process outlined above, the starting material, 3β,17β-diacetoxy-androstan-6β-ol, disclosed by Shopee et al., J. Chem. Soc. 1953, 245, can be conveniently prepared by reacting the diacetate of Δ⁵-androstenediol with hypobromous acid to form the 3,17-diacetate of 5α-bromo-androstane-3β,6β,17β-triol which upon subsequent oxidation with 8 N chromic acid is transformed into 5α-bromo-androstane-3β,17β-diol-6-one. The latter compound is reductively debrominated to form the diacetate of androstane-3β,17β-diol-6-one which is then hydrogenated to produce the desired 3,17-diacetate of androstane-3β,6β,17β-triol (I).

The latter compound (I) is treated with lead tetra-acetate, preferably in a solvent such as benzene, at reflux temperature. Other solvents which are inert to the reaction, for example, aromatic hydrocarbons such as toluene, xylene or ethers such as dioxane, tetrahydrofurane, the methyl ethers of propylene glycol or halogenated aliphatic hydrocarbons such as carbon tetrachloride may replace the benzene and the reaction may then proceed below the boiling point of the solvent. The thus formed diacetate of 6β,19-oxido-androstane-3β,17β-diol (II) is oxidized by reaction with chromic acid in aqueous acetic acid to form the 6,19-lactone of 3β,17β-diacetoxy-6β-hydroxy-androstane-19-carboxylic acid (III). The acetoxy groups are then hyrolyzed by reaction with methanolic potassium hydroxide and the lactone ring which opens during the alkaline treatment is then recyclized by treatment with hydrochloric acid to afford the 6,19-lactone of 3β,6β,17β-trihydroxy-androstane-19-carboxylic acid (IV) which upon oxidation with 8 N chrmoic acid in acetone is transformed into the 6,19-lactone of 3,17-diketo - 6β - hydroxy-androstane-19-carboxylic acid (V). Upon dehydrogenation of the latter as by refluxing the steroid with 2,3-dichloro-5,6-dicyano-1,4-benzoquinone in dioxane for about 24 hours, there is produced the 6,19-lactone of 3,17-diketo-6β-hydroxy-Δ¹,⁴-androstadiene-19-carboxylic acid (VI).

By protection of the 17-keto group of the 6,19-lactone of 3,17-diketo-6β - hydroxy - androstane - 19 - carboxylic acid (V) by formation of the 17-ketal (VII) as by refluxing with a dihydric alcohol such as ethylene glycol in the presence of p-toluenesulfonic acid in benzene for about 18 hours, the surprising discovery was made that in the presence of the lactone moiety, ketal formation at C-3 did not take place under the usual ketalizing conditions and selective ketalization at C-17 was readily accomplished. Upon subsequent reduction of the thus formed 6,19-lactone of 3-keto - 17 - ethylenedioxy - 6β - hydroxy-androstane-19-carboxylic acid (VII) with sodium borohydride, there is formed the 6,19-lactone of 17-ethylenedioxy-3β,6β-dihydroxy-androstane - 19 - carboxylic acid (VIII), which upon treatment with p-toluenesulfonic acid in acetone is converted into the 6,19-lactone of androstane-3β,6β-diol-17-one-19-carboxylic acid (IX).

For formation of the novel lactones containing an aliphatic hydrocarbon radical at C-17α, the following equation illustrates a method for the preparation thereof:

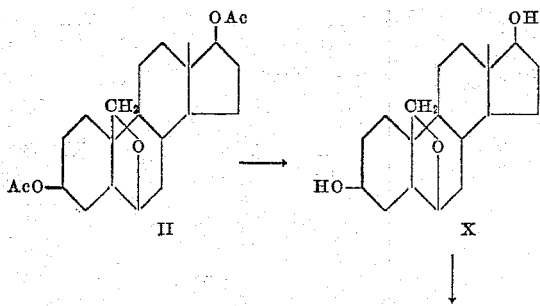

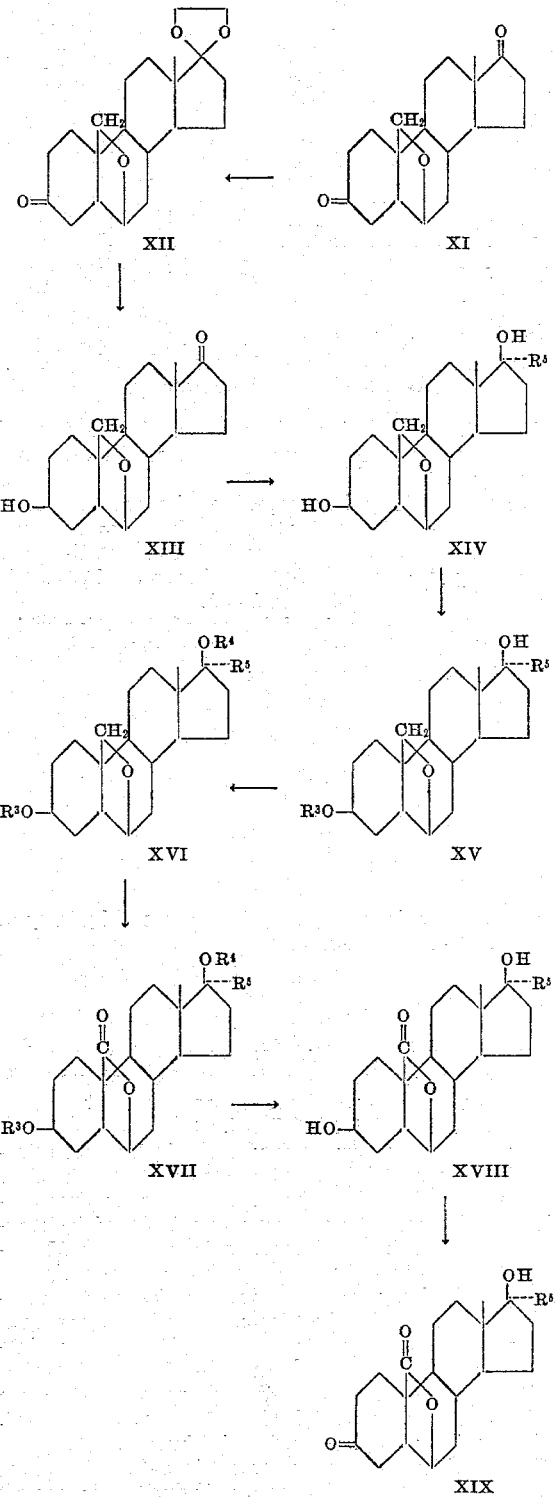

In the above formulas Ac represents acetyl; R⁵ represents an aliphatic hydrocarbon group, saturated or unsaturated, containing up to 8 carbon atoms; R³ and R⁴ represent hydrogen or a hydrocarbon carboxylic acyl group containing up to 12 carbon atoms of the type previously set forth.

In practicing the process outlined above, the diacetate of 6β,19-oxido-androstane-3β,17β-diol (II) is hydrolyzed with dilute methanolic potassium hydroxide under reflux conditions to form the 6β,19-oxido-androstane- 3β,17β-diol (X) which is oxidized, by reaction with chromic acid to form the corresponding diketone (XI). The keto group at C-17 of 6β,19-oxido-androstane-3,17-dione (XI) is protected by formation of the cycloalkyleneketal, achieved by refluxing the 6β,19-oxido-androstane-3,17-dione with a dihydric alcohol such as ethylene glycol in a solvent such as benzene and in the presence of p-toluenesulfonic acid for about six hours with the surprising result that selective ketalization occurs at C-17 in the presence of the oxido group. Upon subsequent reduction of the thus formed 6β,19-oxido-17-ethylenedioxy-androstan-3-one (XII) with a double metal hydride such as sodium borohydride to produce 6β,19-oxido-17-ethylenedioxy-androstan - 3β - ol which is converted by treatment with p-toluenesulfonic acid in acetone into 6β,19-oxido-androstan-3β-ol-17-one (XIII). The latter compound is then reacted with an aliphatic hydrocarbon magnesium halide to convert the 17-keto group into the 17β-hydroxy-17α-aliphatic hydrocarbon grouping. Thus by reaction with methyl magnesium bromide, the 17α-methyl-17β-hydroxy grouping is formed and by similar reaction with an ethyl, vinyl, ethinyl or butenyl Grignard reagent, there is formed the 17β-hydroxyl compound with the respective aliphatic hydrocarbon radical at C-17α. Alternatively, the 17α-ethyl group is introduced by reaction with ethyl-lithium and the ethinyl group can be introduced by the conventional reaction with potassium acetylide. The thus formed 6β,19-oxido-17α-hydrocarbon-androstane-3β,17β-diol (XIV) is esterified by conventional methods with a hydrocarbon carboxylic acid anhydride or chloride containing up to twelve carbon atoms of the type heretofore mentioned to produce the corresponding 3-monoesters (XV). Esterification of the tertiary hydroxyl group at C-17β is effected by reaction with the acid anhydride in benzene solution and in the presence of catalytic amounts of p-toluenesulfonic acid, with simultaneous esterification of a free hydroxyl group at C-3 (XVI). By these esterification methods, there is prepared 3-mono esters as well as 3,17-diesters having identical ester groups or ester groups different from each other.

The diester of 6β,19-oxido-17α-aliphatic hydrocarbon-androstane-3β,17β-diol (XVI) is oxidized by reaction with chromium trioxide in acetic acid under reflux conditions to form the corresponding diester of the 6,19-lactone of 17α-aliphatic hydrocarbon-androstane-3β,6β,17β-triol-19-carboxylic acid (XVII). Upon alkaline hydrolysis of the ester groups, there is formed the 6,19-lactone of 17α-aliphatic hydrocarbon-androstane-3β,6β,17-triol-19-carboxylic acid (XVIII) which upon oxidation with chromic acid in aqueous acetic acid is converted into the 6,19-lactone of 17α-aliphatic hydrocarbon-androstane-6β,17β-diol-3-one-19-carboxylic acid.

The following equation illustrates a novel process for preparing 19-nor-Δ⁴-androstene-3,17-dione from the novel lactones of the present invention:

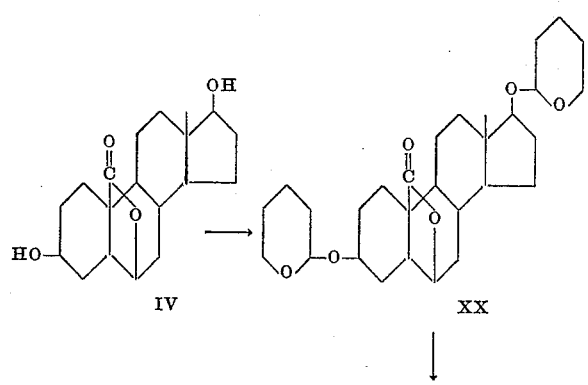

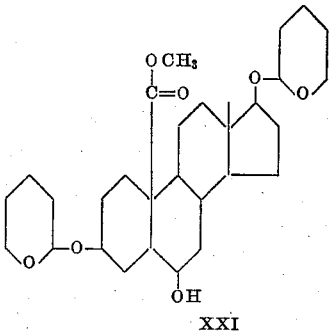

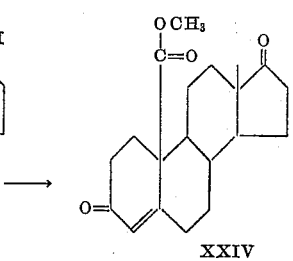

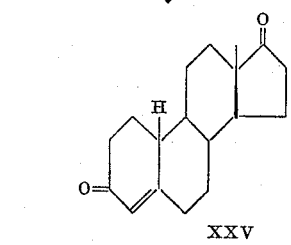

In practicing the novel process outlined above, the hydroxyl groups at C-3 and C-17 of the 6,19-lactone of 3β,6β,17β-trihydroxy-androstane-19-carboxylic acid (IV) are protected by formation of the 3,17-bis-tetrahydropyranyl ether (XX). The latter compound is then dissolved in acetone, treated with an aqueous alkali metal hydroxide solution such as aqueous potassium hydroxide and then with dimethyl sulfate; in this manner the lactone ring is opened and the carboxyl group at C-19 is esterified, producing the lower alkyl, preferably methyl ester of 3β,17β-bis-tetrahydropyranyloxy-6β-hydroxy - androstane-19-carboxylic acid (XXI). By subsequent treatment with thionyl chloride in pyridine, the latter compound is dehydrated to the methyl ester of 3β,17β-bis-tetrahydropyranyloxy-Δ⁵-androstene-19-carboxylic acid (XXII). The ether groups are then hydrolyzed by treatment with hydrochloric acid in acetic acid (XXIII), followed by oxidation under Openauer conditions to afford the methyl ester of 3,17-diketo-$\Delta^4$-androstene-19-carboxylic acid (XXIV). The ester group is then hydrolyzed by alkaline treatment and the alkali metal salt of 3,17-diketo-$\Delta^4$-androstene-19-carboxylic acid is heated with hydrochloric acid to achieve decarboxylation at C–19 to produce 19-nor-$\Delta^4$-androstene-3,17-dione (XXV).

The following examples serve to illustrate but are not intended to limit the scope of the invention:

Example I

A suspension of 10 g. of the diacetate of $\Delta^5$-androstene-3$\beta$,17$\beta$-diol in 100 cc. of dioxane was treated with 12 cc. of 0.46 N perchloric acid and then with 4 g. of N-bromoacetamide; the N-bromoacetamide was added little by little, with stirring, in the course of 1 hour, in the dark and maintaining the temperature around 15° C. The mixture was stirred for 1 hour further in the dark at room temperature; it was then decolorized by the addition of 10% aqueous sodium bisulfite solution, 1 lt. of water was added and the product was extracted with methylene chloride; the extract was washed with water, dried over anhydrous sodium sulfate and the solvent was evaporated under reduced pressure at room temperature. The residue was crystallized from acetone-hexane to afford 3,17-diacetate of 5$\alpha$-bromo-androstane-3$\beta$,6$\beta$,17$\beta$-triol; M.P. 172–174°; $[\alpha]_D$ —44°; yield 77%.

There was prepared 100 cc. of an 8 N solution of chromic acid from 26.7 g. of chromium trioxide, 23 cc. of concentrated sulfuric acid and distilled water. A solution of 10 g. of the 3,17-diacetate of 5$\alpha$-bromo-androstane-3$\beta$,6$\beta$,17$\beta$-triol in 100 cc. of acetone was cooled to 0° C. and treated with the 8 N solution of chromic acid until the characteristic color of chromium trioxide persisted in the mixture. The 8 N solution of chromic acid was added in a slow stream, under an atmosphere of nitrogen, with stirring and at 0° C. The mixture was then stirred at 0° C. under an atmosphere fo nitrogen for 2 minutes further, poured into ice water and the precipitate was collected by filtration, washer with water and dried under vacuum, thus affording the diacetate of 5$\alpha$-bromo-androstane-3$\beta$,17$\beta$-diol-6-one. A sample crystallized from acetone-hexane had M.P. 188–191°; $[\alpha]_D$ —168°.

A mixture of the above compound, 10 g. of zinc dust and 250 cc. of glacial acetic acid was refluxed for 2 hours, at the end of which it was filtered through celite under an atmosphere of nitrogen and the filtrate was concentrated to a small volume under reduced pressure; after cooling it was diluted with ice water and the precipitate of the diacetate of androstane-3$\beta$,17$\beta$-diol-6-one was collected by filtration, washed with water and dried.

The above crude diacetate of androstane-3$\beta$,17$\beta$-diol-6-one was dissolved in a mixture of 80 cc. of absolute ethanol and 120 cc. of glacial acetic acid and hydrogenated in a "Parr" instrument at 50 atmospheres, in the presence of 1.2 g. of platinum oxide, with vigorous agitation and at room temperature for 24 hours; the catalyst was then removed by filtration and the filtrate was evaporated to dryness under reduced pressure; the residue was purified by chromatography on neutral alumina. There was thus obtained the 3,17-diacetate of androstane-3$\beta$,6$\beta$,17$\beta$-triol; M.P. 130–132°; $[\alpha]_D$ —25°.

Example II

To a solution of 4 g. of the 3,17-acetate of androstane-3$\beta$,6$\beta$,17$\beta$-triol in 150 cc. of anhydrous benzene was added 6 g. of lead tetraacetate and the mixture was refluxed for 18 hours. After filtering, the filtrate was diluted with water, the benzene layer was separated, washed with water and the benzene was evaporated under reduced pressure; by chromatography of the residue on neutral alumina there was obtained the diacetate of 6$\beta$,19-oxido-androstane-3$\beta$,17$\beta$-diol; M.P. 140–141° C.; $[\alpha]_D$ +24.5° (chloroform).

Example III

To a solution of 2.5 g. of the above compound in 50 cc. of acetic acid was added 2.5 g. of chromium trioxide dissolved in 100 cc. of 90% acetic acid, little by little, with stirring and maintaining the temperature around 90° C. The mixture was kept at this temperature for 1½ hours and the product was finally precipitated by the addition of ice water; the product was collected and recrystallized from acetone-hexane, thus affording the 6,19-lactone of 3$\beta$,17$\beta$-diacetoxy-androstan-6$\beta$-ol-19-carboxylic acid; M.P. 212–214°; $[\alpha]_D$+8°.

Example IV

A solution of 2 g. of the above compound in 100 cc. of 2% methanolic potassium hydroxide solution was kept overnight at room temperature and then acidified with 2 N hydrochloric acid. The mixture was heated for half an hour on the steam bath, cooled, diluted with ice water and the product was extracted with several portions of ether. The combined extract was washed with water, dried over anhydrous sodium sulfate and the ether was evaporated. There was thus obtained the 6,19-lactone of androstane-3$\beta$,6$\beta$,17$\beta$-triol-19-carboxylic acid, M.P. 187–189°; $[\alpha]_D$±0°.

Example V

The above compound was dissolved in 100 cc. of acetone, cooled to 0° C. and treated with a slow stream of 8 N chromic acid (prepared in the same manner as described in Example I) under an atmosphere of nitrogen, with stirring and at 0° C. The precipitate was collected by filtration, washed with water and dried under vacuum, to thus afford the 6,19-lactone of 3,17-diketo-6$\beta$-hydroxy-androstane-19-carboxylic acid; M.P. 188–191°; $[\alpha]_D$+88°.

Example VI

A mixture of 1.0 g. of the latter compound, 50 cc. of dioxane and 5.0 g. of 2,3-dichloro-5,6-dicyano-1,4-benzoquinone was refluxed for 24 hours. The mixture was cooled, filtered and the solvent was evaporated under reduced pressure. Recrystallization from acetone-hexane yielded the 6,19-lactone of 3,17-diketo-6$\beta$-hydroxy-$\Delta^{1,4}$-androstadiene-19-carboxylic acid.

Example VII

A mixture of 1.0 g. of 6,19-lactone of 3,17-diketo-6$\beta$-hydroxy-androstane-19-carboxylic acid prepared in Example V, 8 cc. of ethylene glycol, 50 mg. of p-toluenesulfonic acid and 100 cc. of benzene was refluxed for 18 hours with concomitant slow azeotropic distillation. The resulting solution was cooled, washed with an aqueous solution of potassium carbonate and evaporated to dryness. Recrystallization of the residue from heptane yielded the 6,19-lactone of 3-keto-17-ethylenedioxy-6$\beta$-hydroxy-androstane-19-carboxylic acid.

To a solution of 2.0 g. of the above compound in 50 cc. of a mixture of tetrahydrofurane and water (90:10), there was slowly added a solution of 500 mg. of sodium borohydride in 10 cc. of water under stirring at room temperature; stirring was continued for three hours. The excess of hydride was decomposed by the addition of acetic acid; the solution was concentrated to a small volume in vacuo and diluted with water. The product was extracted with ethyl acetate and the extract was washed with water, dried and evaporated. Upon recrystallization from acetone-hexane, there was afforded the 6,19-lactone of 3$\beta$,6$\beta$-dihydroxy-17-ethylenedioxy-androstane-19-carboxylic acid, which was cleaved by being allowed to stand with 50 mg. of p-toluenesulfonic acid in 12 cc. of acetone overnight at room temperature. Addition of water yielded the 6,19-lactone of 3$\beta$,6$\beta$-dihydroxy-17-keto-androstane-19-carboxylic acid.

Example VIII

A solution of 2.0 g. of the diacetate of 6β,19-oxido-androstane-3β,17β-diol (prepared in Example II) in 100 cc. of 2% methanolic potassium hydroxide solution was kept overnight at room temperature and then acidified with 2 N hydrochloric acid. The mixture was heated for half an hour on the steam bath, cooled, diluted with ice water and the product was extracted with several portions of ether. The combined extract was washed with water, dried over anhydrous sodium sulfate and the ether was evaporated. There was thus obtained the 6β,19-oxido-androstane-3β,17β-diol, M.P. 184–186°; [α]$_D$ −2°.

Example IX

The above compound was dissolved in acetone, cooled to 0° C. and treated with a slow stream of 8 N chromic acid (prepared in the same manner as described in Example I) under an atmosphere of nitrogen, with stirring and at 0° C. The precipitate was collected by filtration, washed with water and dried under vacuum to thus afford the 6β,19-oxido-androstane-3,17-dione; M.P. 165–167°; [α]$_D$ +125°.

Example X

A mixture of 500 mg. of 6β,19-oxido-androstane-3,17-dione, 4.0 cc. of ethylene glycol, 0.025 g. of p-toluenesulfonic acid and 50 cc. of benzene was refluxed for six hours with concomitant slow azeotropic distillation. The resulting solution was cooled, washed with an aqueous solution of potassium carbonate and evaporated to dryness. Recrystallization of the residue from heptane afforded the 6β,19-oxido-17-ethylenedioxy-androstan-3-one.

To a solution of 2.0 g. of the above compound in 50 cc. of aqueous tetrahydrofuran, there was slowly added a solution of 0.5 g. of sodium borohydride in 10 cc. of water under stirring at room temperature and the stirring was continued for three hours. The excess of hydride was decomposed by the addition of acetic acid; the solution was concentrated to a small volume and then diluted with water. The product was extracted with ethyl acetate and the extract was washed with water, dried and evaporated. Upon recrystallization from acetone-hexane, there was obtained 6β,19-oxido-17-ethylenedioxy-androstan-3β-ol.

The 17 ketal group was cleaved by treating the latter compound with 50 mg. of p-toluenesulfonic acid in 12 cc. of acetone, allowing the mixture to stand overnight at room temperature. Upon addition of water, there was furnished 6β,19-oxido-androstan-3β-ol-17-one.

Example XI

A mixture of the above compound, 200 cc. of thiophene-free anhydrous benzene and 45 cc. of a 3 N solution of methyl magnesium bromide was refluxed for 6 hours; the mixture was then poured into 800 cc. of water containing 80 g. of ammonium chloride and 800 g. of crushed ice, with vigorous stirring. The benzene layer was separated, washed with dilute hydrochloric acid and then with water to neutral, dried over anhydrous sodium sulfate and the benzene was evaporated. The residue was crystallized from acetone-hexane to afford 17α-methyl-6β,19-oxido-androstane-3β,17β-diol.

A mixture of 17α-methyl-6β,19-oxido-androstane-3β,17β-diol, 10 cc. of pyridine and 5 cc. of acetic anhydride was allowed to remain overnight at room temperature. After the usual work-up, there was obtained the 3-monoacetate of 17α-methyl-6β,19-oxido-androstan-3β,17β-diol.

In a similar conventional manner, there was also prepared the propionate, butyrate, benzoate and cyclopentylpropionate.

Example XII

Upon treatment with acetic anhydride in benzene solution and in the presence of p-toluenesulfonic acid, the 3-monoacetate of 6β,19-oxido-17α-methyl-androstane-3β,17β-diol of the preceding example was converted into the corresponding 3,17-diacetate.

Example XIII

By substituting propionic anhydride in the method of the preceding example there was prepared the 3-acetate-17-propionate of 6β,19-oxido-17α-methyl-androstane-3β,17β-diol.

Other diesters such as the 3-propionate-17-acetate; 3-benzoate-17-acetate; and 3,17-dibutyrate were also prepared by substituting the appropriate acid anhydrides.

Example XIV

To a solution of 2 g. of 6β,19-oxido-androstan-3β-ol-17-one in 250 cc. of absolute ether was added little by little, a solution of 10 molar equivalents of ethyl lithium in 50 cc. of ether with mechanical stirring and under an atmosphere of nitrogen.

The mixture was then stirred for 48 hours at room temperature and under an atmosphere of nitrogen; after pouring into water, the mixture was acidified with hydrochloric acid stirring vigorously for 1 hour. The ether layer was separated, washed with water to neutral, dried over anhydrous sodium sulfate, filtered and the ether was evaporated, from the filtrate. Recrystallization of the residue from acetone-hexane yielded 17α-ethyl-6β,19-oxido-androstane-3β,17β-diol.

Conventional esterification with acetic anhydride yielded the corresponding 3-mono-acetate which upon further esterification with acetic anhydride in bnezene solution and in the presence of p-toluenesulfonic acid was converted into the 3,17-diacetate.

Example XV

A solution of 1 g. of potassium metal in 50 cc. of t-butanol was prepared under an atmosphere of nitrogen, cooled to 0° C. and treated with a cold solution of 1 g. of 6β,19-oxido-androstan-3β-ol-17-one (cf. Example X), little by little, under an atmosphere of nitrogen, at 0° C. and under continuous stirring. The nitrogen was then substituted by dry purified acetylene and a stream of this gas introduced into the mixture for 40 hours. The solution was then poured into 200 cc. of dilute hydrochloric acid, stirred for 1 hour at room temperature and the organic solvents removed by steam distillation. The residue was cooled, the solid collected and recrystallized from acetone-hexane, thus furnishing 17α-ethinyl-6β,19-oxido-androstane-3β,17β-diol.

A solution of 500 mg. of the above compound in 10 cc. of pyridine containing 100 mg. of pre-reduced palladium on calcium carbonate was hydrogenated at room temperature until the equivalent of 1 mol of hydrogen had been absorbed; the catalyst was removed by filtration; the pyridine was evaporated under reduced pressure and the residue was triturated with 20 cc. of 1% hydrochloric acid; the product was extracted with ethyl acetate and the extract was washed with water, dried over anhydrous sodium sulfate and evaporated to dryness. By chromatography on neutral alumina, there was obtained 17α-vinyl-6β,19-oxido-androstane-3β,17β-diol.

By applying the methods of esterification described in Examples XI, XII and XIII, there were obtained the 3-monoacetates; 3,17-diacetates; 3-acetate, 17-propionate; 3-propionate, 17-acetate; 3-benzoate-17-acetate; and 3,17-dibutyrates of 17α-vinyl-6β,19-oxido-androstane-3β,17β-diol and of 17α-ethinyl-6β,19-oxido-androstane-3β,17β-diol.

Example XVI

To a solution of 2.5 g. of the diacetate of 17α-methyl-6β,19-oxido-androstane-3β,17β-diol (prepared in Example XII) in 50 cc. of acetic acid was added 2.5 g. of chromium trioxide dissolved in 100 cc. of 90% acetic acid, little by little, with stirring and under reflux temperature. The mixture was kept at this temperature for several hours and the product was finally precipitated by the addition of ice water; the product was collected and recrystallized from acetone-hexane, thus affording the 6,19-lactone of 3β,17β-diacetoxy-17α-methyl-androstan-6β-ol-19-carboxylic acid.

A solution of 2 g. of the above compound in 100 cc. of 2% methanolic potassium hydroxide solution was kept overnight at room temperature and then acidified with 2 N hydrochloric acid. The mixture was heated for half an hour on the steam bath, cooled, diluted with ice water and the product was extracted with several portions of ether. The combined extract was washed with water, dried over anhydrous sodium sulfate and the ether was evaporated. There was thus obtained the 6,19-lactone of 17α-methyl-androstane-3β,6β-triol-19-carboxylic acid.

*Example XVII*

By substituting in the preceding example the 3,17-di-acetate of 17α-methyl-6β,19-oxido-androstane-3β,17β-diol by the 3,17-diacetate of 17α-ethyl-6β,19-oxido-androstane-3β,17β-diol, there was obtained the 6,19-lactone of 17α-ethyl-3β,17β-diacetoxy - androstane - 6β-ol-19 - carboxylic acid and finally 6,19-lactone of 17α-ethyl-androstane-3β,6β,17β-triol-19-carboxylic acid.

In a similar manner, the 3,17-diacetate of 17α-ethinyl-6β,19-oxido-androstane-3β,17β-diol was converted into the corresponding 6,19-lactone and finally into the free alcohol.

By substituting the diacetate by other diesters such as by the 3-acetate-17-propionate; 3-propionate-17-acetate; 3-benzoate-17-acetate; and the 3,17-dibutyrate in the above described method, there were formed the 6,19-lactones of the corresponding esters of 17α-methyl-androstane-3β,6β,17β-triol-19-carboxylic acid, of 17α-ethyl-androstane-3β,6β,17β-triol-19-carboxylic acid; and of 17α-ethinyl-androstane-3β,6β,17β-triol-19-carboxylic acid.

*Example XVIII*

By partial hydrogenation of the 6,19-lactone of 3β,17β-diacetoxy-17α - ethinyl-androstan-6β-ol-19-carboxylic acid described in the preceding example, there was formed the 6,19-lactone of 3β,17β-diacetoxy-17α-vinyl-androstan-6β-ol-19-carboxylic acid.

Thus 1.0 g. of the 6,19-lactone of 3β,17β-diacetoxy-17α-ethinyl-androstan-6β-ol-19-carboxylic acid in 20 cc. of pyridine containing 200 mg. of a catalyst consisting of 2% palladium on barium sulfate was hydrogenated at room temperature. After 35 minutes the uptake of hydrogen was 1.05 mols and had virtually ceased. The catalyst was removed by filtration through celite, the pyridine was evaporated under reduced pressure and the crude reaction product was purified by crystallization from acetone-hexane to give the pure product, the 6,19-lactone of 3β,17β-diacetoxy-17α-vinyl-androstan-6β-ol-19-carboxylic acid.

By following the method described in Example XVI the above compound was converted into the free alcohol, namely, the 6,19-lactone of 17α-vinyl-androstane-3β,6β,17β-triol-19-carboxylic acid.

*Example XIX*

By substituting in the method of the previous example the 6,19-lactone of 3β,17β-diacetoxy-17α-ethinyl-androstan 6β-ol-19-carboxylic acid by the other diesters described in Example XVII, namely the 3-acetate-17-propionate, 3-propionate-17-acetate; 3-benzoate-17-acetate; and the 3,17-dibutyrate of the 6,19-lactone of 17α-ethinyl-androstane-3β,6β,17β-triol-19-carboxylic acid, there were formed the corresponding diesters of the 6,19-lactone of 17α-vinyl-androstan-3β,6β,17β-triol-19-carboxylic acid.

*Example XX*

A mixture of 2.0 g. of the 6,19-lactone of 17α-methyl-androstane-3β,6β,17β-triol-19-carboxylic acid, and 100 cc. of 90% acetic acid was treated with a solution of 3 g. of chromium trioxide in 25 cc. of 90% acetic acid for ½ hour and maintaining the temperature below 20° C. It was then kept at 25° C. for 3 hours, poured into water and the product was extracted with methylene chloride. The extract was washed with aqueous sodium bicarbonate solution and with water to neutral, dried over anhydrous sodium sulfate and evaporated. Recrystallization of the residue from acetone-hexane yielded the 6,19-lactone of 17α-methyl-androstane-6β,17β-diol-3-one-19-carboxylic acid.

*Example XXI*

By substituting in the preceding example the 6,19-lactone of 17α-methyl-androstane-3β,6β,17β-triol-19-carboxylic acid by 6,19-lactone of 17α-ethyl-androstane-3β,6β,17β-triol-19-carboxylic acid, the 6,19-lactone of 17α-ethinyl-androstane-3β,6β,17β-triol-19-carboxylic acid or by the 6,19-lactone of 17α-vinyl-androstane-3β,6β,17β-triol-19-carboxylic acid and following the procedure described in such example, there were prepared the 6,19-lactone of 17α-ethyl-androstane-6β,17β-diol-3-one-19-carboxylic acid, the 6,19-lactone of 17α-ethinyl-androstane-6β,17β-diol-3-one-19-carboxylic acid and the 6,19-lactone of 17α-vinyl-androstane-6β,17β-diol-3-one-19-carboxylic acid.

*Example XXII*

The 6,19-lactone of androstane-3β,6β,17β-triol-19-carboxylic acid prepared in Example IV, was dissolved in 100 cc. of benzene, treated with 10 cc. of tetrahydropyrane and then with 300 mg. of p-toluenesulfonic acid monohydrate and kept at room temperature for 24 hours. The mixture was then successively washed with 5% aqueous sodium bicarbonate solution and water, dried over anhydrous sodium sulfate and the benzene was evaporated under reduced pressure. There was thus obtained the 6,19-lactone of 3β,17β-bis-tetrahydropyranyloxy-androstan-6β-ol-19-carboxylic acid.

A solution of 2 g. of the above compound in 200 cc. of acetone was treated with a solution of 2 g. of potassium hydroxide in 20 cc. of water and the mixture refluxed for 1 hour, cooled and immediately treated with 10 cc. of dimethyl sulfate. The mixture was kept at 20° C. for 18 hours, at the end of which it was slowly treated with ice water until complete precipitation of the product, which was collected, washed with water and air dried. There was thus obtained the methyl ester of 3β,17β-bis-tetrahydropyranyloxy-androstan-6β-ol-19-carboxylic acid.

*Example XXIII*

The above compound was dissolved in 50 cc. of pyridine, cooled to 0° C. and treated, little by little, under stirring with 2 cc. of thionyl chloride while the temperature was maintained around 0° C. The mixture was kept for 3 hours further at 0° C., then poured into ice water and the product was extracted with ether. The extract was washed with water, the ether was evaporated and the residue chromatographed on neutral alumina, thus yielding the methyl ester of 3β,17β-bis-tetrahydropyranyloxy-Δ⁵-androstene-19-carboxylic acid.

To a solution of 1 g. of the above compound in 20 cc. of acetic acid was added 2 cc. of 2 N hydrochloric acid and the mixture was kept at room temperature for 30 minutes, at the end of which the product was precipitated by the addition of water, collected by filtration, washed with water and dried. There was thus obtained the methyl ester of Δ⁵-androstene-3β,17β-diol-19-carboxylic acid.

*Example XXIV*

From a solution of 1 g. of the above compound in 40 cc. of dry toluene and 10 cc. of cyclohexanone there were removed the traces of moisture by azeotropic distillation of a few cc.; there was then added 500 mg. of aluminum isopropylate dissolved in 5 cc. of anhydrous toluene and the mixture was refluxed for 45 minutes, at the end of which the volatile solvents were removed by steam distillation. The residue was extracted with ether, the extract was washed with water, dried over anhydrous sodium sulfate and the ether was evaporated. The residue consisted essentially of the methyl ester of Δ⁴-androstene-3,17-dione-19-carboxylic acid; the latter was dissolved in 50 cc. of 2% methanolic potassium hydroxide solution kept overnight at room temperature and then heated under reflux for 2 hours. It was then acidified with dilute hydrochloric acid and heated on the steam bath for 30 minutes. After concentrating to a small volume the mixture was cooled, diluted with water and the precipitate was collected, washed with water, dried and purified by chromatography on neutral, alumina, thus furnishing 19-nor-Δ⁴-androstene-3,17-dione.

We claim:

1. A compound of the following formula:

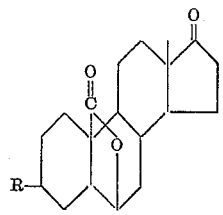

wherein R is selected from the group consisting of keto, β-hydroxy and β-hydrocarbon carboxylic acyloxy containing up to 12 carbon atoms.

2. The 6,19-lactone of 3,17-diketo-androstan 6β-ol-19-carboxylic acid.

3. The 6,19-lactone of 3,17-diketo-Δ¹,⁴-androstadien-6β-ol-19-carboxylic acid.

4. The 6,19-lactone of 17-keto-androstane-3β,6β-diol-19-carboxylic acid.

5. A compound of the following formula:

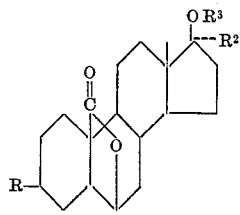

wherein R is selected from the group consisting of keto, β-hydroxy and β-hydrocarbon carboxylic acyloxy containing up to 12 carbon atoms; R² is selected from the group consisting of hydrogen and an aliphatic hydrocarbon group containing up to 8 carbon atoms; and R³ is selected from the group consisting of hydrogen and a hydrocarbon carboxylic acyl group containing up to 12 carbon atoms.

6. The 6,19-lactone of 3β,17β-diacetoxy-androstane-6β-ol-19-carboxylic acid.

7. The 6,19-lactone of androstane-3β,6β,17β-triol-19-carboxylic acid.

8. The 6,19-lactone of 17α-methyl-androstane-3β,6β,17β-triol-19-carboxylic acid.

9. The 6,19-lactone of 17α-ethyl-3β,17β-diacetoxyandrostan-6β-ol-19-carboxylic acid.

10. The 6,19-lactone of 17α-ethinyl-androstane-3β,6β,17β-triol-19-carboxylic acid.

11. The 6,19-lactone of 17α-methyl-androstane-6β,17β-diol-3-one-19-carboxylic acid.

12. The 6,19-lactone of 17α-ethinyl-androstane-6β,17β-diol-3-one-19-carboxylic acid.

13. In the process of producing 19-nor-Δ⁴-androstene-3,17-dione the steps comprising condensing a 6β-hydroxy androstane with lead tetraacetate to form a 6β,19-oxido-androstane and then oxidizing with chromium trioxide to form the corresponding 6,19-lactone of androstan-6β-ol-19-carboxylic acid.

14. The process of claim 13 wherein the 6β-hydroxy androstane is 3β,17β-diacetoxy-6β-hydroxy-androstane.

15. The process of claim 13, wherein the condensation is effected in an inert organic solvent.

16. The process of claim 13, wherein the condensation is effected in benzene.

17. In the process of producing 19-nor-Δ⁴-androstene-3,17-dione the step which comprises reacting a 3β,17β-diacyloxy-6β-hydroxy androstane with lead tetraacetate.

18. A process for producing 19-nor-Δ⁴-androstene-3,17-dione which comprises condensing a 3β,17β-diacyloxy-6β-hydroxy-androstane with lead tetraacetate, oxidizing the thus formed 6β,19 - oxido - 3β,17β - diacyloxy-androstane with chromic trioxide to form the lactone of 3β,17β-diacyloxy-androstan-6β-ol-19-carboxylic acid, treating the latter with a saponifying agent and then with a mineral acid, reacting the thus formed 6,19-lactone of androstane-3β,6β,17β-triol-19-carboxylic acid with tetrahydropyran to form the 3,17-bis-tetrahydropyranyl ether of the 6,19-lactone of androstane-3β,6β,17β-triol-19-carboxylic acid which is treated with an alkali metal hydroxide and a di-lower alkyl sulfate to form the lower alkyl ester of 3β,17β-bis-tetrahydropyranyloxy-androstan-6β-ol-19-carboxylic acid, dehydrating the latter compound with an acid to produce the lower alkyl ester of 3β,17β-bis-tetrahydropyranyloxy-Δ⁵-androstene-19-carboxylic acid, hydrolyzing the ether groups with a mineral acid, followed by treatment with an aluminum alkoxide in the presence of a ketone hydrogen acceptor to form the lower alkyl ester of 3,17-diketo-Δ⁴-androstene-19-carboxylic acid, hydrolyzing the latter compound with an alkali metal hydroxide and decarboxylating by heating with a mineral acid to form 19-nor-Δ⁴-androstene-3,17-dione.

19. The process of claim 17 wherein the 3β,17β-diacyloxy - 6β - hydroxy-androstane is 3β,17β-diacetoxy-6β-hydroxy-androstane.

No references cited.

UNITED STATES PATENT OFFICE
CERTIFICATE OF CORRECTION

Patent No. 3,036,068                                May 22, 1962

Howard J. Ringold et al.

It is hereby certified that error appears in the above numbered patent requiring correction and that the said Letters Patent should read as corrected below.

Column 6, lines 20 to 31, formula XXII should appear as shown below instead of as in the patent:

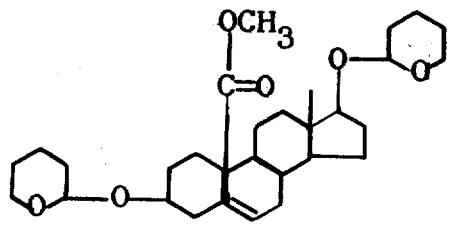

Signed and sealed this 4th day of September 1962.

(SEAL)
Attest:

ERNEST W. SWIDER                                DAVID L. LADD

Attesting Officer                                     Commissioner of Patents